L. R. HAHN AND O. L. MILLER.
BACKWATER STOP OR VALVE.
APPLICATION FILED MAR. 26, 1920.
1,348,993.
Patented Aug. 10, 1920.
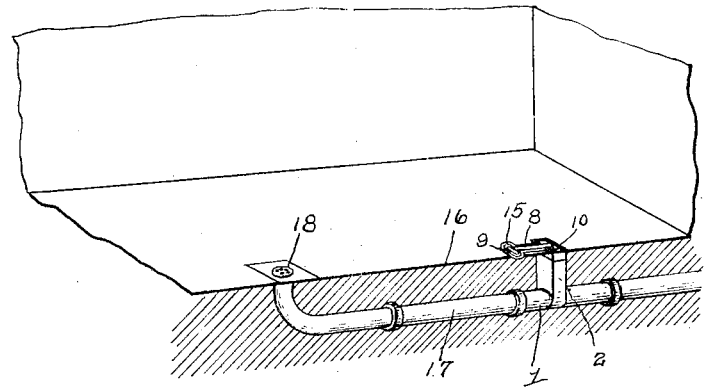
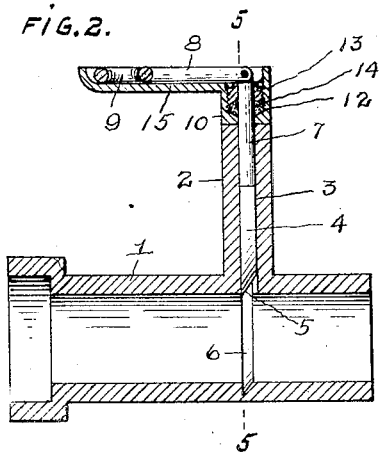
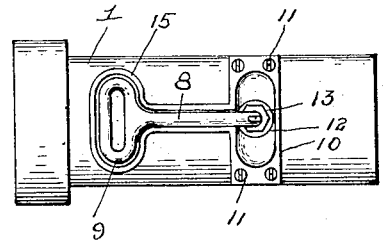
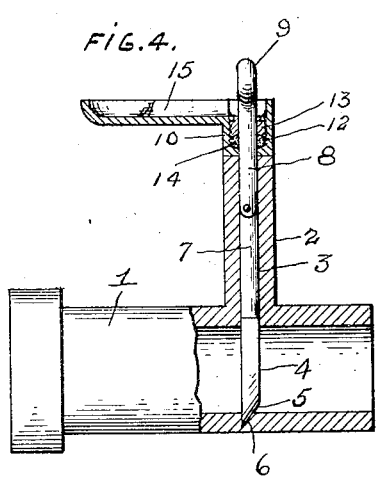
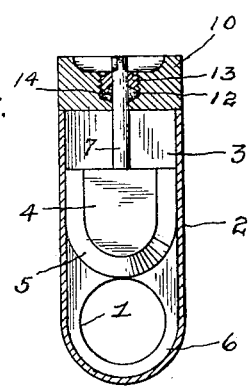
INVENTORS.
LOWELL R. HAHN
OSCAR L. MILLER
BY
Carey S. Frye
ATTORNEY

UNITED STATES PATENT OFFICE.

LOWELL R. HAHN AND OSCAR L. MILLER, OF KOKOMO, INDIANA.

BACKWATER STOP OR VALVE.

1,348,993. Specification of Letters Patent. Patented Aug. 10, 1920.

Application filed March 26, 1920. Serial No. 369,048.

*To all whom it may concern:*

Be it known that we, LOWELL R. HAHN and OSCAR L. MILLER, citizens of the United States, residing at Kokomo, in the county of Howard and State of Indiana, have invented new and useful Improvements in Backwater Stops or Valves, of which the following is a specification.

This invention relates to back water stops or valves and the prime feature of the invention is the provision of a valve for completely closing the passage through a drain pipe or sewer connection when desired, the valve having means attached thereto for manipulating the valve.

A further feature of the invention is in so constructing the valve operating means that it will lie flat with the floor surface when the valve is in open position, means being provided for housing the protruding portion of the valve operating means when not in use.

A further feature of the invention is the provision of a cutting edge on the valve for severing any foreign particles that might be deposited in the drain pipe or sewer connection and thus insuring the positive seating of the valve.

A further feature of the invention is in so constructing the device that the parts may be readily assembled and at the same time produce a water tight structure.

Other objects and advantages will be hereinafter more fully set forth and pointed out in the accompaying specification.

In the accompanying drawings which are made a part of this application,

Figure 1 is a perspective view showing the device applied to use, parts being shown in section.

Fig. 2 is a central longitudinal sectional view through the drain pipe with the valve in open position.

Fig. 3 is a top plan view thereof.

Fig. 4 is a view similar to Fig. 2 with the valve in closed position.

Fig. 5 is a sectional view as seen on line 5—5 Fig. 2.

Referring to the accompanying drawings in which similar reference numerals designate corresponding parts throughout the several views, 1 indicates a pipe section, preferably formed of metal and in any desired shape or dimension, said section having an extension 2 formed thereon of a width substantially the same as the diameter of the pipe section and extending at right angles to the pipe section.

Extending through the extension 2 is an opening 3 in which is slidably mounted a valve 4, said valve being preferably flat and having its side and lower edges tapered to form a cutting edge 5 and this cutting edge enters a tapered channel 6 in the inner walls of the section 1 and the end walls of the extension 2.

Attached to the valve 4 is a stem 7, to the free end of which is pivotally attached an operating handle 8, the outer end of the handle having a hand hold 9 thereon so that it may be grasped and the valve raised or lowered with ease, the hand hold being of great assistance in forcing the valve downwardly when the cutting edge 5 encounters and is forced through any foreign substance that might be within the pipe.

Fitting over the outer end of the extension 2 is a block 10 which is removably attached to the extension by screws 11 or the like, said block closing the outer end of the opening 3 and to prevent leakage around the stem 7 where it passes through the block, a packing chamber 12 is formed in the block and into said chamber is threaded a packing nut 13, the outer end of the nut having means thereon, preferably flat faces for engagement with a wrench, for tightening the nut against the packing 14 in the packing chamber.

The valve and its controlling means is preferably placed within the confines of a building and in order to prevent parts of the device projecting above the floor surface when the valve is in open position, a casing 15 is extended outwardly from one face of the block 10 into which seats the handle 8 and hand hold 9, the upper edge of the casing being flush with the floor surface 16, and while the handle lies in a plane below the floor surface, it is within convenient reach when the valve is to be closed.

In operating the device, as when water or sewage begins to back up in the pipe line 17, the hand hold 9 is grasped and the handle moved to a vertical position, when downward pressure is directed against the handle and the valve moved to closed position and should there be any foreign particles in the pipe line in the path of the valve, the cutting edge 5 will sever such obstruction and permit the valve to fully seat.

The flat face of the valve is away from the pressure of the back water, consequently the flat face of the valve will be pressed against the flat face of the channel 6, thus forming a perfect seal between these parts and preventing the back water reaching the drain trap 18.

As soon as the back water recedes the valve is again raised to open position and the handle lowered into the casing 15, which action disposes the handle below the level of the floor surface and locks the valve in open position.

The invention claimed is:

1. A back water stop including a pipe section, a hollow extension connected with the pipe section, a valve slidably mounted in said extension, a closure block for the outer end of the extension, a stem attached to said valve and projecting through said block, a packing chamber in the block through which the stem projects, a packing nut entering the packing chamber, and a handle section pivotally attached to the upper end of the stem.

2. A back water stop including a pipe section, an extension attached to the pipe section and having an opening therethrough communicating with the interior of the pipe section, a valve slidable in said extension, means for severing foreign particles in the path of said valve, a closure block attached to the outer end of the extension, a packing chamber in said block, a valve stem projecting through said packing chamber, a packing nut for forming a water tight joint around said stem, and a handle section pivoted to the end of said stem for operating said valve.

3. A back water stop including a pipe section, a hollow extension connected with the pipe section, a valve slidably mounted in the extension and movable across the opening in the pipe section, a stem attached to the valve, a handle section pivoted to the stem, and a housing for the reception of the handle section when not in use.

4. A back water stop including a pipe section, a hollow extension on the pipe section, a block removably attached to the outer end of the extension, a valve in said extension, a stem attached to the valve and projecting through the block, a handle section pivoted to the stem, and a housing extending laterally from the block adapted to receive the handle section when not in use.

In testimony whereof we hereto affix our signatures.

LOWELL R. HAHN.
OSCAR L. MILLER.